United States Patent
Murata (10) Patent No.: US 10,754,594 B2
(45) Date of Patent: Aug. 25, 2020

(54) COMPUTER-READABLE MEDIUM, INFORMATION PROCESSING DEVICE, AND SYSTEM FOR SHORTENING TIME FOR PRINTING WITH DESIRED PRINT QUALITY

(71) Applicant: BROTHER KOGYO KABUSHIKI KAISHA, Nagoya, Aichi (JP)

(72) Inventor: Mareyuki Murata, Ogaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 16/401,428

(22) Filed: May 2, 2019

(65) Prior Publication Data
US 2019/0347055 A1 Nov. 14, 2019

(30) Foreign Application Priority Data
May 10, 2018 (JP) ................. 2018-091117

(51) Int. Cl.
G06F 3/12 (2006.01)
(52) U.S. Cl.
CPC .......... *G06F 3/1208* (2013.01); *G06F 3/1227* (2013.01); *G06F 3/1228* (2013.01); *G06F 3/1263* (2013.01)
(58) Field of Classification Search
None
See application file for complete search history.

(56) References Cited

U.S. PATENT DOCUMENTS

| | | | | |
|---|---|---|---|---|
| 6,456,404 B1* | 9/2002 | Furuya | ..................... | H04N 1/46 358/1.9 |
| 6,975,416 B2* | 12/2005 | Tomita | .................. | G06F 3/1206 358/1.13 |
| 6,977,737 B2* | 12/2005 | Lea | ......................... | G06K 15/00 358/1.1 |
| 8,711,425 B2* | 4/2014 | Puigardeu | ............. | G06F 3/1208 358/1.2 |
| 8,786,905 B2* | 7/2014 | Iinuma | ............... | G03G 15/6585 347/101 |

(Continued)

FOREIGN PATENT DOCUMENTS

JP 2016-099700 A 5/2016

*Primary Examiner* — Dung D Tran
(74) *Attorney, Agent, or Firm* — Scully, Scott, Murphy & Presser, PC (57) ABSTRACT

A non-transitory computer-readable medium storing computer-readable instructions that, when executed by a processor of an information processing device, cause the processor to receive image data representing a target image, detect feature image data representing a feature image from the image data, determine range data based on the feature image data, the range data representing a first end position and a second end position of a feature-image including range including the feature image in a particular direction, the particular direction corresponding to a conveyance direction for conveying a printing sheet, generate print instruction data based on the range data, the print instruction data including a command for instructing the printer to print the feature-image including range with priority on print quality and print a range of the target image other than the feature-image including range with priority on a printing speed, and output the print instruction data including the command.

11 Claims, 8 Drawing Sheets

(56) References Cited

U.S. PATENT DOCUMENTS

| | | | |
|---|---|---|---|
| 8,991,959 B2* | 3/2015 | Nitta | B41J 2/2139 |
| | | | 347/12 |
| 9,135,534 B2* | 9/2015 | Takamoto | G06K 15/1822 |
| 2004/0046817 A1* | 3/2004 | Kato | B41J 2/2125 |
| | | | 347/15 |
| 2004/0246527 A1* | 12/2004 | Kakutani | H04N 1/6019 |
| | | | 358/3.01 |
| 2008/0100862 A1* | 5/2008 | Isshiki | H04N 1/33307 |
| | | | 358/1.15 |
| 2008/0304891 A1* | 12/2008 | Saijo | G06K 1/121 |
| | | | 400/76 |
| 2009/0185206 A1* | 7/2009 | Uemura | H04N 1/6072 |
| | | | 358/1.9 |
| 2020/0042842 A1* | 2/2020 | Nakamura | G06F 3/1208 |

* cited by examiner

COMPUTER-READABLE MEDIUM, INFORMATION PROCESSING DEVICE, AND SYSTEM FOR SHORTENING TIME FOR PRINTING WITH DESIRED PRINT QUALITY

CROSS-REFERENCE TO RELATED APPLICATION

This application claims priority under 35 U.S.C. § 119 from Japanese Patent Application No. 2018-091117 filed on May 10, 2018. The entire subject matter of the application is incorporated herein by reference.

BACKGROUND

Technical Field

Aspects of the present disclosure are related to a non-transitory computer-readable medium, an information processing device, and a system for shortening a period of time required for printing with desired print quality.

Related Art

Technologies to print on a sheet a feature image (e.g., a barcode) having particular features have been known.

SUMMARY

A feature image such as a barcode is desired to be printed with priority on print quality. Nonetheless, there is a potential risk that it might take a longer period of time to perform printing with priority on print quality.

Aspects of the present disclosure are advantageous to provide one or more improved techniques that make it possible to shorten a period of time required for printing a feature image with desired print quality.

According to aspects of the present disclosure, a non-transitory computer-readable medium is provided, which stores computer-readable instructions that are executable by a processor of an information processing device communicably connected with a printer. The instructions are configured to, when executed by the processor, cause the processor to receive image data representing a target image to be printed, detect feature image data from the received image data, the feature image data representing a feature image having particular features, determine range data based on the detected feature image data, the range data representing a first end position and a second end position of a feature-image including range in a particular direction, the feature-image including range including the feature image and being included in the target image, the particular direction corresponding to a conveyance direction in which the printer conveys a printing sheet to print the target image, generate print instruction data based on the determined range data, the print instruction data including a particular command for instructing the printer to perform a first printing process to print the feature-image including range with priority on print quality and perform a second printing process to print a range of the target image other than the feature-image including range with priority on a printing speed, and output the generated print instruction data including the particular command, to cause the printer to perform the first printing process and the second printing process.

According to aspects of the present disclosure, further provided is an information processing device including a communication interface configured to communicate with a printer, and a controller. The controller is configured to receive image data representing a target image to be printed, detect feature image data from the received image data, the feature image data representing a feature image having particular features, determine range data based on the detected feature image data, the range data representing a first end position and a second end position of a feature-image including range in a particular direction, the feature-image including range including the feature image and being included in the target image, the particular direction corresponding to a conveyance direction in which the printer conveys a printing sheet to print the target image, generate print instruction data based on the determined range data, the print instruction data including a particular command for instructing the printer to perform a first printing process to print the feature-image including range with priority on print quality and perform a second printing process to print a range of the target image other than the feature-image including range with priority on a printing speed, and output the generated print instruction data including the particular command, to cause the printer to perform the first printing process and the second printing process.

According to aspects of the present disclosure, further provided is a system including a printer and an information processing device. The information processing device includes a communication interface configured to communicate with the printer, and a controller configured to receive image data representing a target image to be printed, detect feature image data from the received image data, the feature image data representing a feature image having particular features, determine range data based on the detected feature image data, the range data representing a first end position and a second end position of a feature-image including range in a particular direction, the feature-image including range including the feature image and being included in the target image, the particular direction corresponding to a conveyance direction in which the printer conveys a printing sheet to print the target image, generate print instruction data based on the determined range data, the print instruction data including a particular command for instructing the printer to perform a first printing process to print the feature-image including range with priority on print quality and perform a second printing process to print a range of the target image other than the feature-image including range with priority on a printing speed, and output the generated print instruction data including the particular command, to cause the printer to perform the first printing process and the second printing process.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
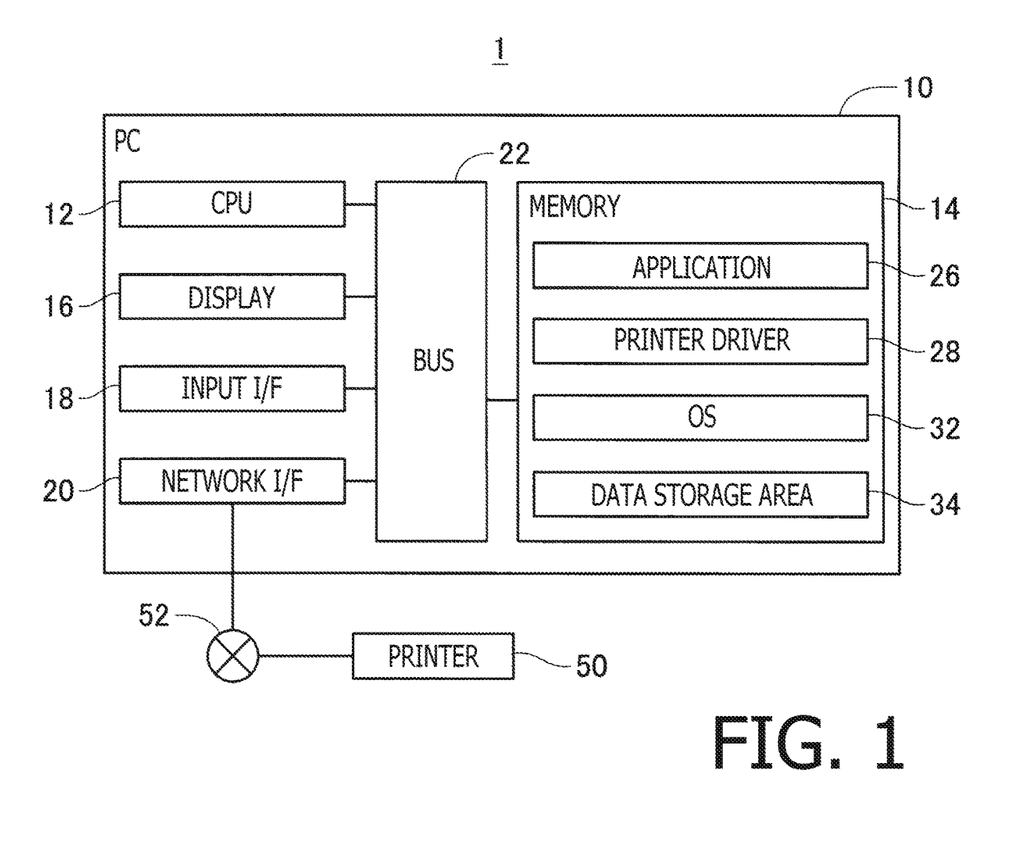
FIG. 1 is a block diagram schematically showing a configuration of a communication system including a PC and a printer, in an illustrative embodiment according to one or more aspects of the present disclosure.

As shown in FIG. 1, a communication system 1 of the illustrative embodiment includes a PC 10 and a printer 50.

The PC 10 includes a CPU 12, a memory 14, a display 16, an input I/F ("I/F" is an abbreviation of "interface") 18, and a network I/F 20. These elements are communicably interconnected via a bus 22.

The PC 10 is configured to communicate with the printer 50 via the network I/F 20 and a network 50. Examples of a communication system applicable between the PC 10 and the printer 50 may include, but are not limited to, wired LAN, USB, Wi-Fi (registered trademark), and Bluetooth (registered trademark). The printer 50 may be a thermal printer having a thermal head in a direct thermal printing method to print an image on a heat-sensitive paper or a thermal transfer printing method to print an image with a heat-sensitive ink ribbon and a thermal head. The printer 50 is configured to communicate various kinds of information and instruction signals with the PC 10. The printer 50 is further configured to print an intended image by heating one or more dots specified from among a plurality of dots of the thermal head.

The CPU 12 of the PC 10 is configured to perform various kinds of processing in accordance with an application 26, a printer driver 28, and an OS 32. The application 26 is a program for browsing and printing a file of a particular format (e.g., a PDF format). For instance, the application 26 may be Adobe Reader (registered trademark). The printer driver 28 is a device driver for the printer 50 and is configured to control operations of the printer 50. The OS 32 is a program configured to provide basic functions usable by the application 26 and the printer driver 28. It is noted that hereinafter, the CPU 12 executing a program such as the printer driver 28 may be merely referred to as a name of the program. For instance, "the printer driver 28" may denote "the CPU 12 executing the printer driver 28."

The memory 14 has a data storage area 34. The data storage area 34 is a storage area to store data necessary for executing the application 26. The memory 14 may include at least two of memory elements such as a RAM, a ROM, a flash memory, an HDD, and a buffer of the CPU 12.

The memory 14 may be non-transitory computer-readable storage media including but not limited to the above-exemplified memory elements, a CD-ROM and a DVD-ROM. The non-transitory computer-readable storage media are tangible media. Meanwhile, electric signals carrying programs downloaded from a server on the Internet may be classified as computer-readable signal media but are not included in the non-transitory computer-readable storage media.

The display 16 is configured to display thereon various kinds of information. Examples of the display 16 may include, but are not limited to, an LCD and an organic EL display. The input I/F 18 is an interface configured to accept user operations. The input I/F 18 may include a keyboard and a mouse. Further, the input I/F 18 may include a touch panel overlaid on a display surface of the display 16.

In the following description, processes, operations, and steps of flowcharts may basically represent processing by the CPU 12 in accordance with instructions written in programs. Namely, in the following description, operations such as "determining," "extracting," "selecting," "calculating," "specifying," "receiving," "acquiring," "accepting," and "controlling" may represent processing by the CPU 11. Processing by the CPU 11 may include hardware control via the OS 32. Further, "acquiring" may include a concept of acquiring a thing with no need to make a request for the thing. Specifically, for instance, an operation of the CPU 11 receiving data without making a request for the data may be included in a concept "the CPU 11 acquires the data." Further, "data" referred to in the present disclosure may be expressed as a computer-readable bit string. Further, two pieces of data that have substantially the same contents and have mutually different formats may be treated as the same data. The same applies to "information" referred to in the present disclosure. Further, operations of "instructing," "responding," and "requesting" may be carried out by transmitting information indicating a corresponding "instruction," a corresponding "response," and a corresponding "request," respectively. Further, an operation of "setting" may be carried out by storing input setting information into a memory.

Figure 2:
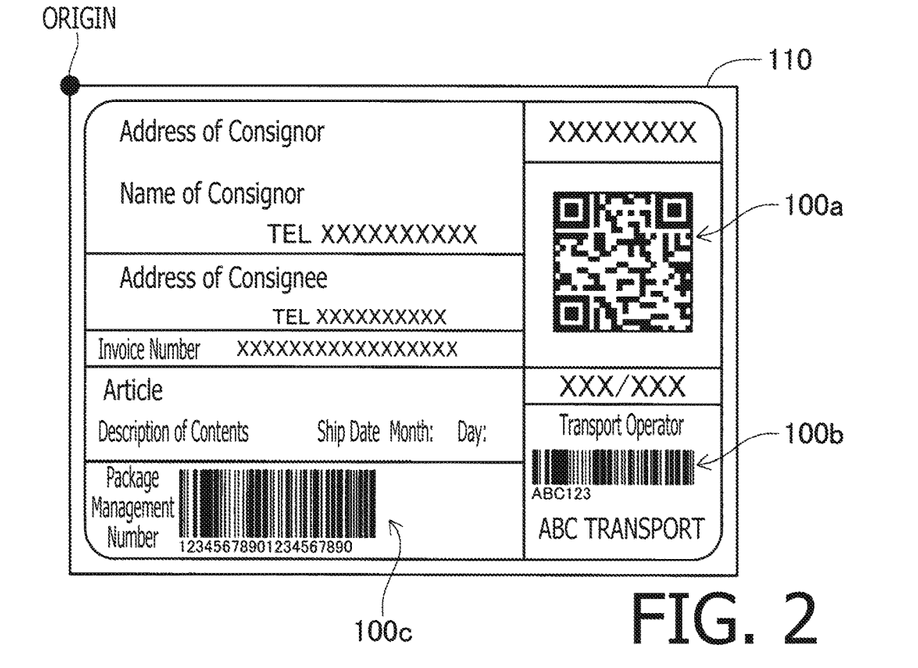
FIG. 2 exemplifies a code including image in the illustrative embodiment according to one or more aspects of the present disclosure.

In the communication system 1, for instance, as shown in FIG. 2, when printing a code including image 110 that includes code images 100a, 100b, and 100c each including at least one of a barcode (i.e., a one-dimensional code) and a two-dimensional code, the printer 50 prints areas containing the code images 100a, 110b, and 100c with priority on print quality, while printing the other areas with priority on a printing speed.

Figure 3:
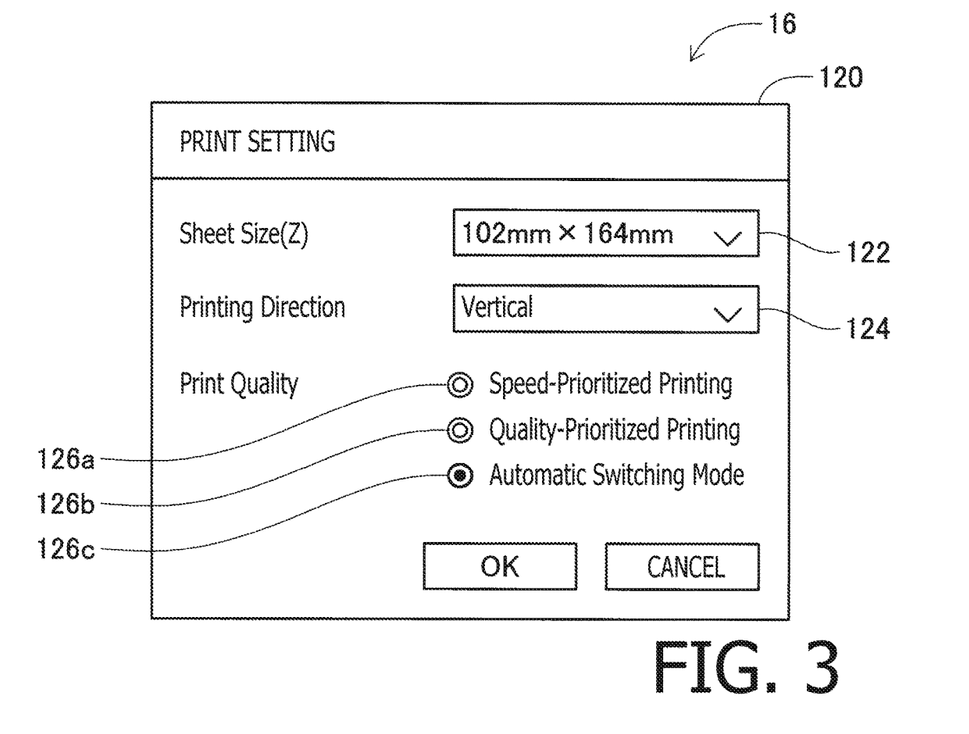
FIG. 3 exemplifies a setting screen in the illustrative embodiment according to one or more aspects of the present disclosure.

Specifically, for instance, on the PC 10, in response to accepting a user operation to a print setting button (not shown) via the input I/F 18 while displaying the code including image 110 on the display 16, the application 26 transmits an instruction to the printer driver 28 via the OS 32. Then, the OS 32 causes the display 16 to display a setting screen 120 (see FIG. 3). As shown in FIG. 3, the setting screen 120 includes setting fields 122 and 124, and radio buttons 126a, 126b, and 126c. The setting field 122 is for setting a sheet size. The setting field 124 is for setting a printing direction. The radio buttons 126a, 126b, and 126c are for setting print quality.

A speed-prioritized printing process, which is set responsive to a user operation to the radio button 126a, is a printing process to be performed for a whole area of a target image with priority on the printing speed. A quality-prioritized printing process, which is set responsive to a user operation to the radio button 126*b*, is a printing process to be performed for the whole area of the target image with priority on the print quality. A quality-speed-prioritized printing process, which is set responsive to a user operation to the radio button 126*c*, is a printing process in which the printer 50 performs quality-prioritized printing for ranges each including at least one of the code images 100*a*, 100*b*, and 100*c* of the code including image 110 and performs speed-prioritized printing for the other ranges of the whole area of the target image.

Then, after print settings (e.g., a sheet size and print quality) have been configured in response to user operations to the setting fields 122 and 124 and the radio buttons 126*a*, 126*b*, and 126, when a print execution button (not shown) of the application 26 is operated, the application 26 transmits a print instruction to the printer driver 28 via the OS 32. At this time, image data (hereinafter, which may be referred to as "vector image data") vectorized based on PDF image data is transmitted to the printer driver 28, along with the print instruction. The vector image data is image data interpretable by the printer driver 28. In another instance, at this time, raster image data may be transmitted to the printer driver 28, instead of the vector image data. Further, the print instruction includes information (hereinafter, which may be referred to as "setting information") on the print settings configured via the setting screen 120. In addition to the setting information such as the sheet size and the print quality, the print instruction includes information on an orientation (e.g., landscape or portrait) of a printing sheet.

In response to receiving the print instruction from the application 26, the printer driver 28 requests the OS 32 to convert the vector image data received along with the print instruction into bitmap image data. In response to receiving the request, the OS 32 converts the vector image data into bitmap image data. Thus, the printer driver 28 receives the bitmap image data from the OS 32. Then, the printer driver 28 generates print data based on the bitmap image data, and transmits the generated print data to the printer 50. At this time, the printer driver 28 generates a command according to the setting information, i.e., a command for causing the printer 50 to perform printing according to the print settings represented by the setting information, and incorporates the generated command into the print data.

In response to receiving the print data from the printer driver 28, the printer 50 performs printing based on the print data. For instance, when the command included in the print data is a command according to setting information representing the speed-prioritized printing, the printer 50 performs printing with priority on the printing speed. Specifically, the printer 50 is a thermal printer configured to perform printing on a printing sheet with the thermal head disposed along a conveyance path, while conveying the printing sheet along the conveyance path at one of four settable conveyance speeds. The four settable conveyance speeds are a lowest speed, a second lowest speed, a second highest speed, and a highest speed in an ascending order of the conveyance speed.

In the speed-prioritized printing, the printing sheet is preferred to be conveyed at the highest speed. Nonetheless, from the viewpoint of durability and power consumption, it is undesirable to heat, at a time, a particular number or more of dots among the plurality of dots of the thermal head. Specifically, the printer 50 includes the thermal head having 1200 dots, and is not allowed to heat more than 300 dots of the 1200 dots at a time.

Therefore, when required to heat dots of a number equal to or less than 300 in an attempt to print a single line along which the 1200 dots are arranged, the printer 50 heats at a time the dots as required. Further, when required to heat dots of a number more than 300 and equal to or less than 600 in an attempt to print a single line along which the 1200 dots are arranged, the printer 50 heats the dots as required, in two separate operations. For instance, in this case, the printer 50 may heat 300 dots in a first heating operation. Then, after completion of the first heating operation, the printer 50 may heat the residual dots of a number resulting from subtracting 300 from the number of the dots required to be heated, in a second heating operation. Further, when required to heat dots of a number more than 600 and equal to or less than 900 in an attempt to print a single line along which the 1200 dots are arranged, the printer 50 heats the dots as required, in three separate operations. For instance, in this case, the printer 50 may heat 300 dots in a first heating operation. Then, after completion of the first heating operation, the printer 50 may heat 300 dots among the residual dots of a number resulting from subtracting 300 from the number of the dots required to be heated, in a second heating operation. After completion of the second heating operation, the printer 50 may heat the residual dots of a number resulting from subtracting 600 from the number of the dots required to be heated, in a third heating operation. Further, when required to heat dots of a number more than 900 and equal to or less than 1200 in an attempt to print a single line along which the 1200 dots are arranged, the printer 50 heats the dots as required, in four separate operations. For instance, in this case, the printer 50 may heat 300 dots in a first heating operation. Then, after completion of the first heating operation, the printer 50 may heat 300 dots among the residual dots of a number resulting from subtracting 300 from the number of the dots required to be heated, in a second heating operation. After completion of the second heating operation, the printer 50 may heat 300 dots among the residual dots of a number resulting from subtracting 600 from the number of the dots required to be heated, in a third heating operation. After completion of the third heating operation, the printer 50 may heat the residual dots of a number resulting from subtracting 900 from the number of the dots required to be heated, in a fourth heating operation.

Thus, in an attempt to print a single line by heating target dots in a plurality of separate operations while conveying a printing sheet at the highest speed, there is a potential risk that the printer 50 might not properly perform printing. Therefore, when printing a single line by heating the target dots in four separate operations, the printer 50 conveys the printing sheet at the lowest speed. Further, when printing a single line by heating the target dots in three separate operations, the printer 50 conveys the printing sheet at the second lowest speed. Furthermore, when printing a single line by heating the target dots in two separate operations, the printer 50 conveys the printing sheet at the second highest speed. Moreover, when printing a single line by heating the target dots in a single operation, the printer 50 conveys the printing sheet at the highest speed.

Thus, as the number of dots to be heated in single-line printing increases, the printer 50 conveys the printing sheet at a lower speed, thereby securing appropriate printing. In other words, the printer 50 conveys the printing sheet at a higher speed as the number of dots to be heated in single-line printing decreases. Hence, it is possible to shorten a period of time required for printing. Thus, the printer 50 appropriately performs printing with priority on the printing speed.

Further, when the command included in the print data received by the printer 50 is a command according to setting information representing the quality-prioritized printing, the printer 50 performs printing with priority on the print quality. In the quality-prioritized printing, the printer 50 conveys the printing sheet at the lowest speed, regardless of the number of dots required to be heated in single-line printing. Thus, the printer 50 appropriately performs printing with priority on the print quality.

As described above, in the communication system 1, in response to a user operation to the radio button 126a on the setting screen 120, the printer 50 performs printing with priority on the printing speed. Meanwhile, in response to a user operation to the radio button 126b on the setting screen 120, the printer 50 performs printing with priority on the print quality. For instance, when the code including image 110 shown in FIG. 2 is a target image to be printed, the printer 50 may perform printing with priority on the print quality such that the code images 100a, 100b, and 100c would be appropriately scanned. However, as described above, in the quality-prioritized printing process, the printer 50 conveys the printing sheet at the lowest speed. Therefore, it takes a long period of time to perform the quality-prioritized printing process. To avoid such a long period of time for printing, in response to a user operation to the radio button 126c on the setting screen 120, the printer 50 performs the quality-speed-prioritized printing process.

Hereinafter, referring to FIGS. 4 to 7, an explanation will be provided of a process to be performed by the CPU 12 executing the printer driver 28 to cause the printer 10 to perform the quality-speed-prioritized printing process. In response to receiving a print instruction from the application 26 (S100), the printer driver 28 (more specifically, the CPU 12 executing the printer driver 28) requests the OS 32 to convert vector image data received along with the print instruction into bitmap image data (S102). In response to receiving the request, the OS 32 converts the vector image data into bitmap image data. Then, the printer driver 28 receives the bitmap image data from the OS 32 (S104). It is noted that the OS 32 may not necessarily convert the vector image data into the bitmap image data but may convert the vector image data into image data in any other format as long as the printer driver 28 may extract barcode images from the image data acquired via the conversion. Further, when the image data received in S100 is in such a format that the printer driver 28 is allowed to extract barcode images from the received image data, the steps S102 to S104 may be omitted.

Figure 4:
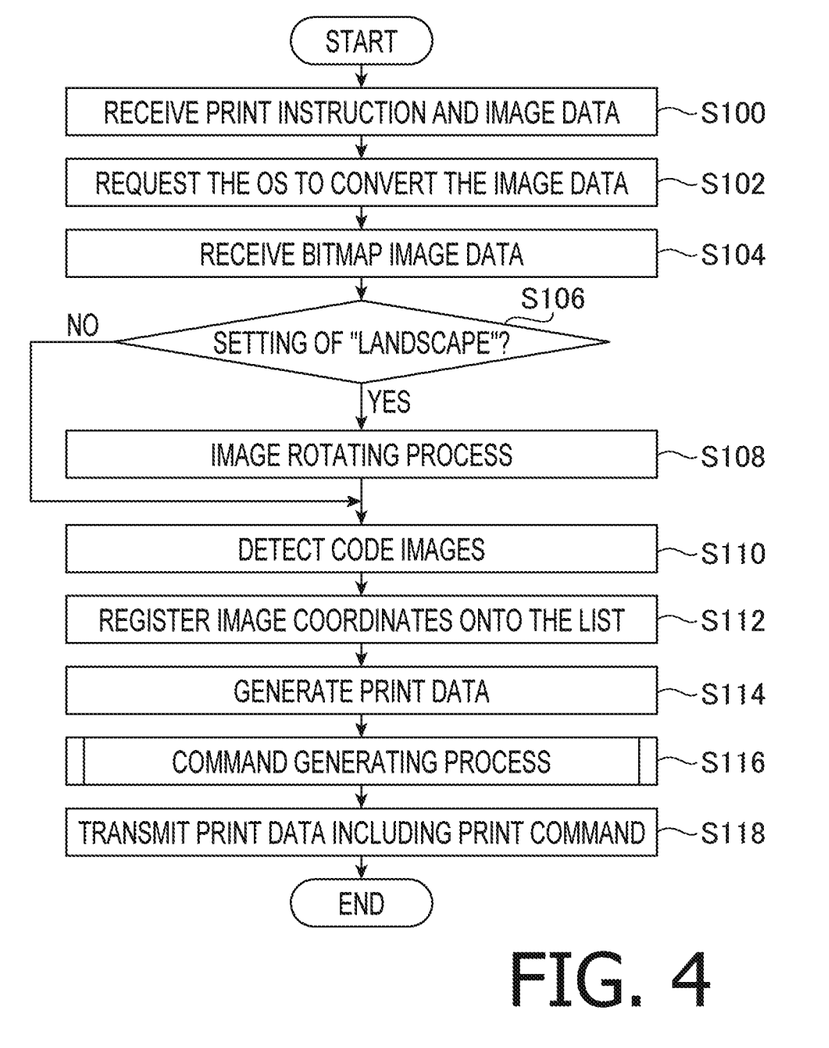
FIGS. 4 to 7 are flowcharts showing a process to be performed by the PC executing a printer driver, in the illustrative embodiment according to one or more aspects of the present disclosure.

Subsequently, the printer driver 28 determines whether a setting of "landscape" is set, based on the setting information included in the print instruction (S106). When "Horizontal" is selected among selectable options "Vertical" and "Horizontal" in the setting field 124 on the setting screen 120, the setting information includes a setting of "landscape." When determining that a setting of "landscape" is set (S106: Yes), the printer driver 28 performs an image rotating process to rotate an image represented by the image data received in S104 (S108). Then, the printer driver 28 goes to S110. Meanwhile, when determining that a setting of "landscape" is not set (S106: No), the printer driver 28 skips S108 and goes to S110.

The printer driver 28 detects a set of coordinates (hereinafter referred to as "image coordinates") representing a range (hereinafter referred to as an "image including range") including each of the code images 100a, 100b, and 100c, from the image data (e.g., the image data representing the code including image 110) received in S104 (S110). Specifically, the printer driver 28 analyzes the image data of the code including image 110 and detects feature data each piece of which has features as image data representing at least one of a barcode and a two-dimensional code. Then, the printer driver 28 calculates positional information specifying positions of an image represented by each piece of the detected feature data, as positional information specifying positions of a corresponding one of the code images 100a, 100b, and 100c. Further, the printer driver 28 calculates respective width dimensions and respective height dimensions of the code images 100a, 100b, and 100c. Then, the printer driver 28 calculates respective offset amounts of the code images 100a, 100b, and 100c with respect to an origin of the image based on the bitmap image data. The origin is a point represented by coordinates of a particular corner of the image (i.e., the code including image 110) based on the bitmap image data.

Figure 8:
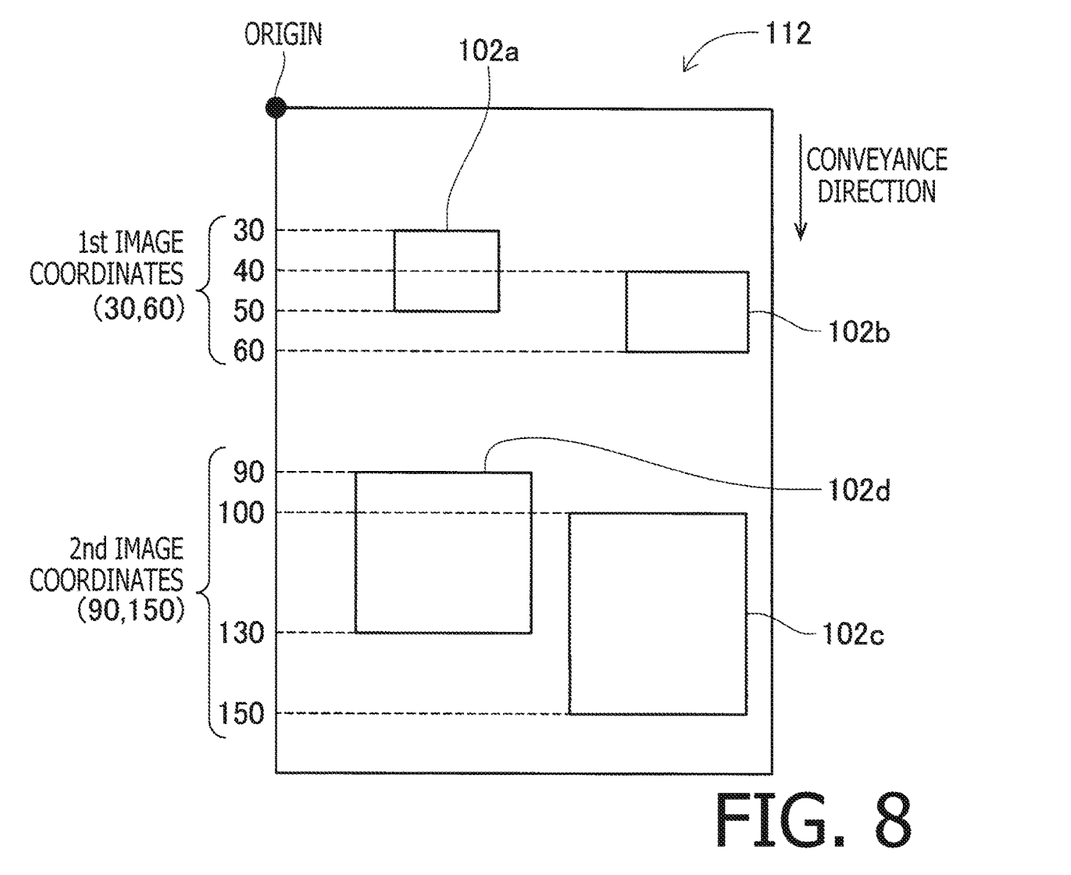
FIG. 8 exemplifies another code including image in the illustrative embodiment according to one or more aspects of the present disclosure.

Subsequently, the printer driver 28 registers, onto a list, a set of image coordinates of each of the detected code images 100a, 100b, and 100c (S112). Hereinafter, image coordinates for specifying an image including range will be described in detail, using a code including image 112 shown in FIG. 8. It is noted that the code including image 112 shown in FIG. 8 is different from the code including image 110 shown in FIG. 2. The code including image 112 includes four code images 102a, 102b, 102c, and 102d. When printing the code including image 112 on a printing sheet, the printer 50 conveys the printing sheet in a conveyance direction corresponding to a longitudinal direction of the code including image 112. Hereinafter, the longitudinal direction of the code including image 112 may be referred to as "the conveyance direction for the code including image." Image coordinates of an image including range are defined as coordinates specifying an upstream end position and a downstream end position of the image including range in the conveyance direction for the code including image 112. In the following description, each set of image coordinates may be written in a form of (the upstream end position, the downstream end position).

Specifically, image coordinates of the code image 102a are (30, 50). Likewise, image coordinates of the code image 102b are (40, 60). Image coordinates of the code image 102c are (100, 150). Image coordinates of the code image 102c are (90, 130). It is noted that, in the following description, the code images 102a, 102b, 102c, and 102d may be referred to as the "first code image 102a," the "second code image 102b," the third code image 102c," and the "fourth code image 102d," respectively, for the sake of definite distinction among them.

Figure 9A:
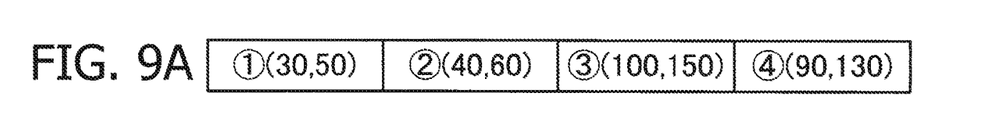
FIGS. 9A to 9C exemplify changes of image coordinates registered on a list during execution of the process as shown in FIGS. 4 to 7, in the illustrative embodiment according to one or more aspects of the present disclosure.

In S112, the printer driver 28 stores the image coordinates of each of the code images 102a, 102b, 102c, and 102d, in a manner as shown in FIG. 9A, as a list in the data storage area 34. Thereafter, the printer driver 28 generates print data based on the image data received in S104 (S114). Subsequently, the printer driver 28 performs a command generating process to generate a print command (S116).

Figure 5:
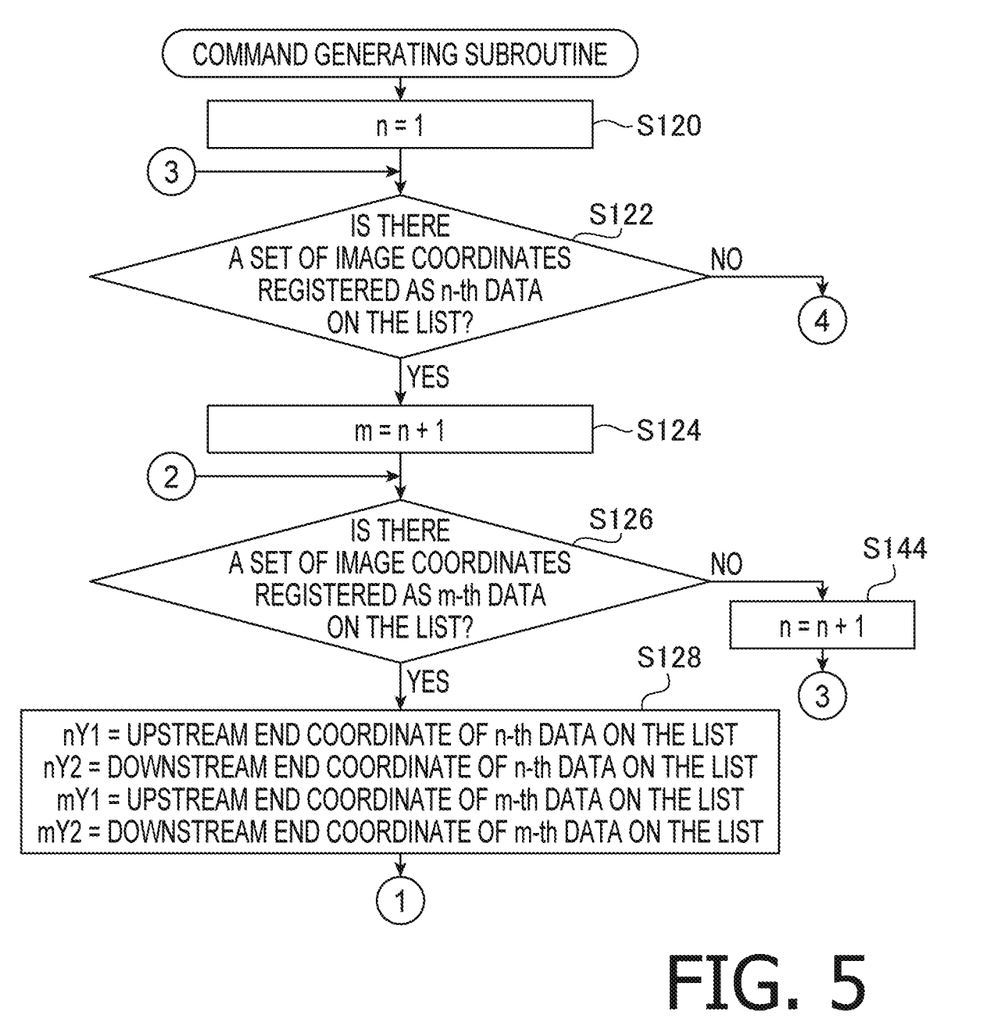
Figure 6:
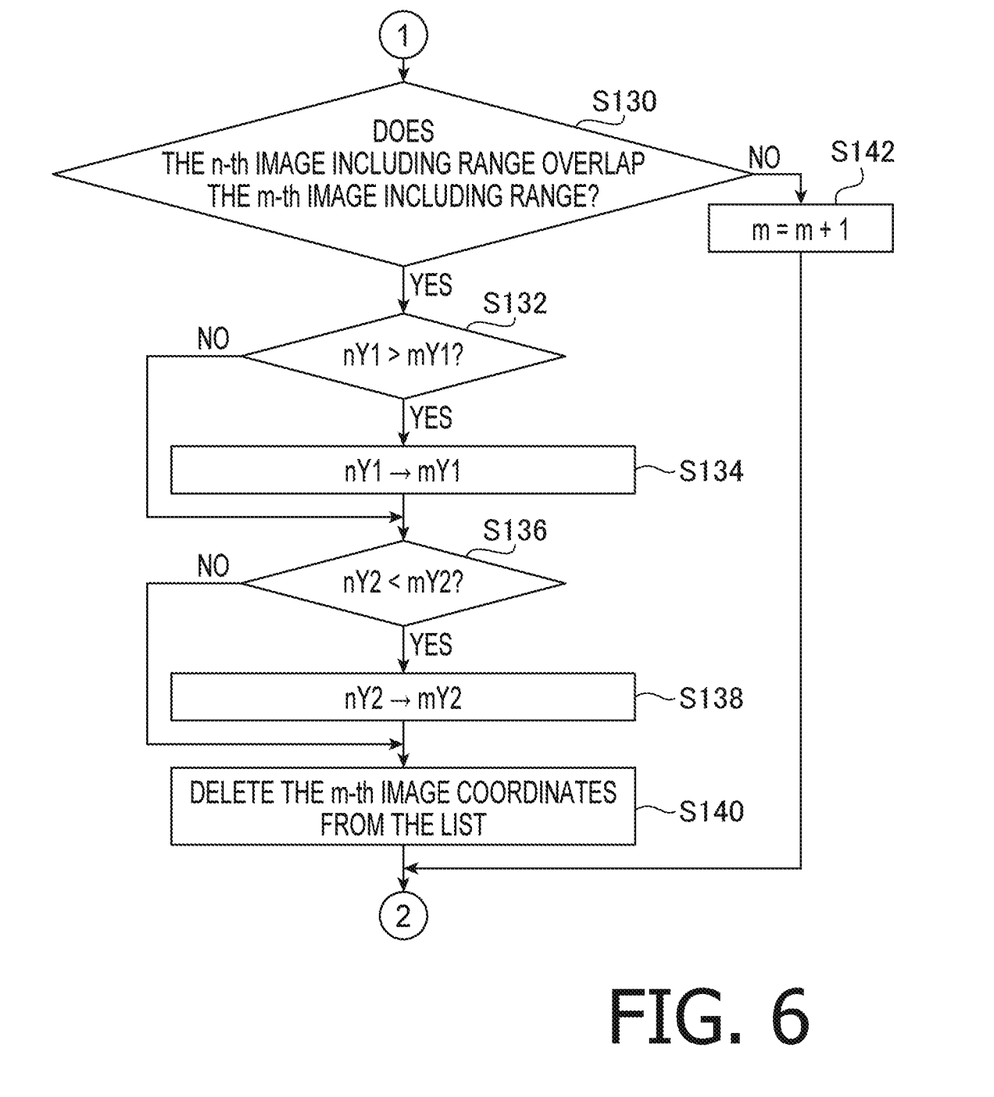
Figure 7:
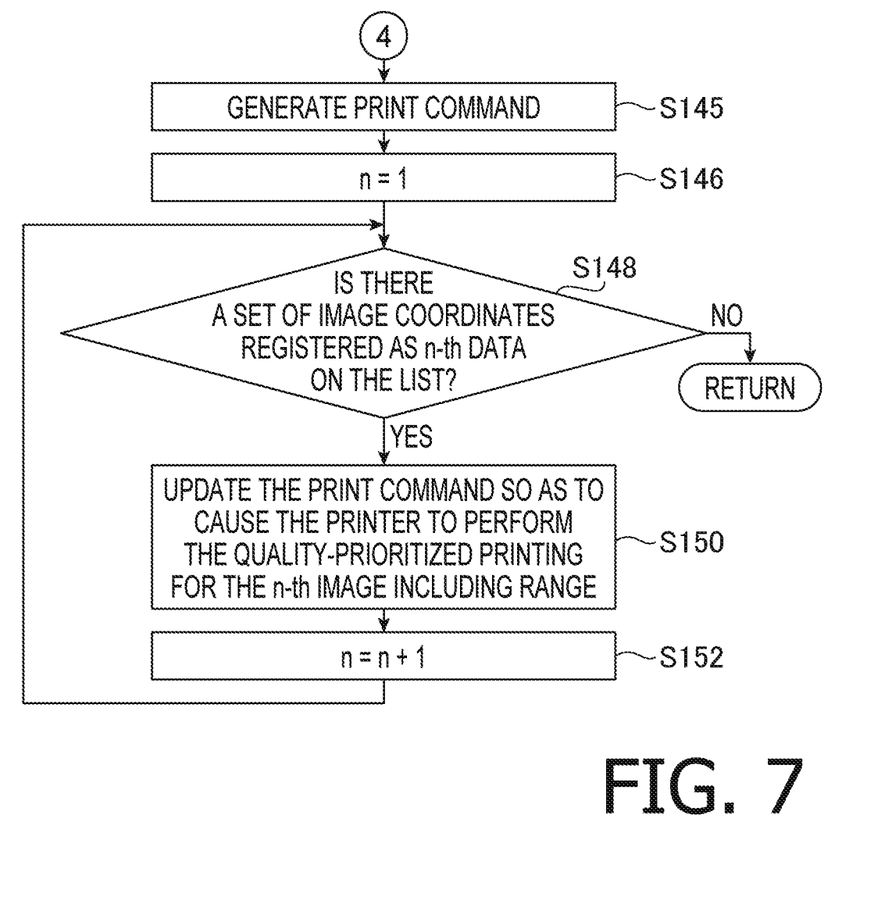

Referring to FIGS. 5 to 7, a specific procedure of the command generating process (hereinafter, which may be referred to as a "command generating subroutine") will be described. First, the printer driver 28 sets "n" to 1 (S120). Next, the printer driver 28 determines whether there is a set of image coordinates registered as n-th data on the list (S122). At this time, "n" is set to 1 in S120, and a set of image coordinates (30, 50) exists as first data on the list as shown in FIG. 9A. Therefore, the printer driver 28 determines that there is a set of image coordinates registered as n-th data on the list (S122: Yes). Then, the printer driver 28 sets "m" to "n+1" (S124). Namely, in S124, the printer driver 28 sets "m" to 2. Subsequently, the printer driver 28 determines whether there is a set of image coordinates registered as m-th data on the list (S126). At this time, "m" is set to 2 in S124, and a set of image coordinates (40, 60) exists as second data on the list. Therefore, the printer driver 28 determines that there is a set of image coordinates registered as the m-th data on the list (S126: Yes).

Then, the printer driver 28 sets the coordinate of the upstream end of the n-th data on the list to "nY1," sets the coordinate of the downstream end of the n-th data on the list to "nY2," sets the coordinate of the upstream end of the m-th data on the list to "mY1," and sets the coordinate of the downstream end of the m-th data on the list to "mY1" (S128). Namely, in S128, the printer driver 28 sets (nY1, nY2) to (30, 50), and sets (mY1, mY2) to (40, 60). Subsequently, the printer driver 28 determines whether an n-th image including range and an m-th image including range overlap each other so as to cover a same range in the conveyance direction for the code including image 112 (S130). Namely, the printer driver 28 determines whether an image including range represented by first image coordinates (30, 50) on the list overlaps an image including range represented by second image coordinates (40, 60) on the list, so as to cover a same range in the conveyance direction. At this time, the image including range represented by the first image coordinates (30, 50) overlaps the image including range represented by the second image coordinates (40, 60), so as to cover a same range of 40 to 50 in the conveyance direction. Therefore, the printer driver 28 determines that the first image including range and the second image including range overlap each other (S130: Yes).

Figure 9B:
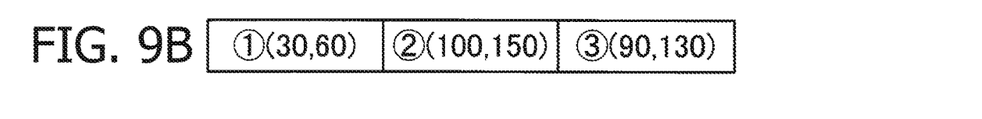

Subsequently, the printer driver 28 determines whether "nY1" is larger than "mY1" (S132). At this time, since "nY1" is 30, and "mY1" is 40, the printer driver 28 determines that "nY1" is smaller than "mY1" (S132: No). Next, the printer driver 28 determines whether "nY2" is smaller than "mY2" (S136). At this time, since "nY2" is 50, and "mY2" is 60, the printer driver 28 determines that "nY2" is smaller than "mY2" (S136: Yes). Then, the printer driver 28 changes "nY2" to "mY2" (S138). Namely, in the first image coordinates on the list, the value of 50 is changed to 60. Thereby, as shown in FIG. 9B, the first image coordinates on the list are set to (30, 60). Namely, in a process of the steps S128 to S138, the printer driver 28 specifies a set of image coordinates representing each of the ranges in each of which at least one of the first code image 102a and the second code image 102b exists in the conveyance direction for the code including image 112.

Then, the printer driver 28 deletes the m-th image coordinates, i.e., the second image coordinates from the list (S140). Thereby, third image coordinates and fourth image coordinates are moved up in a registration order on the list. More specifically, as shown in FIGS. 9A and 9B, the third image coordinates are moved up to the second image coordinates, and the fourth image coordinates are moved up to the third image coordinates.

Subsequently, the printer driver 28 determines whether there is a set of image coordinates registered as the m-th data on the list (S126). At this time, "m" is set to 2 in S124, and as shown in FIG. 9B, the second image coordinates (100, 150) exist on the list. Hence, the printer driver 28 determines that there is a set of image coordinates registered as the m-th data on the list (S126: Yes). Then, the printer driver 28 sets (nY1, nY2) to (30, 60), and sets (mY1, mY2) to (100, 150).

Subsequently, the printer driver 28 determines whether a first image including range and a second image including range overlap each other so as to cover a same range in the conveyance direction for the code including image 112 (S130). Namely, the printer driver 28 determines whether an image including range represented by the first image coordinates (30, 60) on the list overlaps an image including range represented by the second image coordinates (100, 150) on the list, so as to cover a same range in the conveyance direction. At this time, the printer driver 28 determines that the first image including range and the second image including range do not overlap each other (S130: No). Then, the printer driver 28 increments "m" by one (S142). Namely, the printer driver 28 sets "m" to 3.

Subsequently, the printer driver 28 determines whether there is a set of image coordinates registered as the m-th data (i.e., the third data) on the list (S126). At this time, as shown in FIG. 9B, the list has the third image coordinates (90, 130). Therefore, the printer driver 28 determines that there is a set of image coordinates registered as the m-th data on the list (S126: Yes). Then, the printer driver 28 sets (nY1, nY2) to (30, 60), and sets (mY1, mY2) to (90, 130) (S128).

Subsequently, the printer driver 28 determines whether a first image including range and a third image including range overlap each other so as to cover a same range in the conveyance direction for the code including image 112 (S130). Namely, the printer driver 28 determines whether an image including range represented by the first image coordinates (30, 60) on the list overlaps an image including range represented by the third image coordinates (90, 130) on the list, so as to cover a same range in the conveyance direction. At this time, the printer driver 28 determines that the first image including range and the third image including range do not overlap each other (S130: No). Then, the printer driver 28 increments "m" by one (S142). Namely, the printer driver 28 sets "m" to 4.

Subsequently, the printer driver 28 determines whether there is a set of image coordinates registered as the m-th data (i.e., the fourth data) on the list (S126). At this time, as shown in FIG. 9B, the list does not have any image coordinates registered as the fourth data thereon. Therefore, the printer driver 28 determines that there is not a set of image coordinates registered as the m-th data on the list (S126: No). Then, the printer driver 28 increments "n" by one (S144). Namely, the printer driver 28 sets "n" to 2. Subsequently, the printer driver 28 determines whether there is a set of image coordinates registered as the n-th data (i.e., the second data) on the list (S122). At this time, as shown in FIG. 9B, the list has the second image coordinates (100, 150). Therefore, the printer driver 28 determines that there is a set of image coordinates registered as the n-th data on the list (S122: Yes).

Next, the printer driver 28 sets "m" to "n+1" (S124). Namely, the printer driver 28 sets "m" to 3. Subsequently, the printer driver 28 determines whether there is a set of image coordinates registered as the m-th data (i.e., the third data) on the list (S126). At this time, as shown in FIG. 9B, the list has the third image coordinates (90, 130). Therefore, the printer driver 28 determines that there is a set of image coordinates registered as the m-th data on the list (S126: Yes). Then, the printer driver 28 sets (nY1, nY2) to (100, 150), and sets (mY1, mY2) to (90, 130) (S128).

Subsequently, the printer driver 28 determines whether a second image including range and a third image including range overlap each other so as to cover a same range in the conveyance direction for the code including image 112 (S130). Namely, the printer driver 28 determines whether an image including range represented by the second image coordinates (100, 150) on the list overlaps an image including range represented by the third image coordinates (90, 130) on the list, so as to cover a same range in the conveyance direction. At this time, the image including range represented by the second image coordinates (100, 150) overlaps the image including range represented by the third image coordinates (90, 130), so as to cover a same range of 100 to 130 in the conveyance direction. Therefore, the printer driver 28 determines that the second image including range and the third image including range overlap each other (S130: Yes).

Figure 9C:
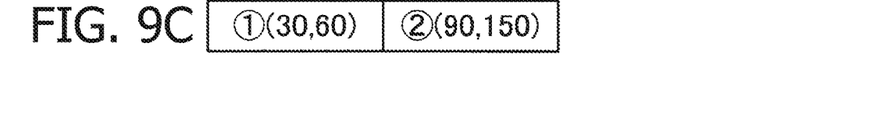

Subsequently, the printer driver 28 determines whether "nY1" is larger than "mY1" (S132). At this time, "nY1" is 100, and "mY1" is 90. Hence, the printer driver 28 determines that "nY1" is larger than "mY1" (S132: Yes). Then, the printer driver 28 changes "nY1" to "mY1" (S134). Namely, in the second image coordinates on the list, 100 is changed to 90. Thereby, as shown in FIG. 9C, the second image coordinates on the list are set to (90, 150).

Subsequently, the printer driver 28 determines whether "nY2" is smaller than "mY2" (S136). At this time, "nY2" is 150, and "mY2" is 130. Therefore, the printer driver 28 determines that "nY2" is larger than "mY2" (S136: No). Then, the printer driver 28 deletes the m-th image coordinates (i.e., the third image coordinates) from the list (S140). Thereby, as shown in FIG. 9C, two sets of image coordinates, i.e., the first image coordinates (30, 60) and the second image coordinates (90, 150) remain registered on the list.

Subsequently, the printer driver 28 determines whether there is a set of image coordinates registered as the m-th data (i.e., the third data) on the list (S126). At this time, as shown in FIG. 9C, the list does not have any image coordinates registered as the third data thereon. Therefore, the printer driver 28 determines that there is not a set of image coordinates registered as the m-th data on the list (S126: No). Then, the printer driver 28 increments "n" by one (S144). Namely, the printer driver 28 sets "n" to 3. Next, the printer driver 28 determines whether there is a set of image coordinates registered as the n-th data (i.e., the third data) on the list (S122). At this time, as shown in FIG. 9C, the list does not have any image coordinates registered as the third data thereon. Therefore, the printer driver 28 determines that there is not a set of image coordinates registered as the n-th data on the list (S122: No). Through the aforementioned process, in the code including image 112, the first image coordinates (30, 60) and the second image coordinates (90, 150) as shown in FIG. 8 are specified as image including ranges in which the code images 102*a*, 102*b*, 102*c*, and 102*d* exist.

Subsequently, the printer driver 28 generates a print command for instructing the printer 50 to print an image represented by the code including image 112 (S145). Then, the printer driver 28 sets "n" to 1 (S146). Next, the printer driver 28 determines whether there is a set of image coordinates registered as the n-th data (i.e., the first data) on the list (S148). At this time, as shown in FIG. 9C, the list has the first image coordinates (30, 60). Therefore, the printer driver 28 determines that there is a set of image coordinates registered as the n-th data on the list (S148: Yes). Next, the printer driver 28 updates the print command in such a manner as to cause the printer 50 to print the image including range specified by the first image coordinates (30, 60) with priority on the print quality (S150). Then, the printer driver 28 increments "n" by one (S152). Namely, the printer driver 28 sets "n" to 2.

Subsequently, the printer driver 28 determines whether there is a set of image coordinates registered as the n-th data (i.e., the second data) on the list (S148). At this time, as shown in FIG. 9C, the list has the second image coordinates (90, 150). Therefore, the printer driver 28 determines that there is a set of image coordinates registered as the n-th data on the list (S148: Yes). Next, the printer driver 28 updates the print command to cause the printer 50 print the image including range specified by the second image coordinates (90, 150) with priority on the print quality (S150).

Then, the printer driver 28 increments "n" by one (S152). Namely, the printer driver 28 sets "n" to 3. Subsequently, the printer driver 28 determines whether there is a set of image coordinates registered as the n-th data (i.e., the third data) on the list (S148). At this time, as shown in FIG. 9C, the list does not have any image coordinates registered as the third data thereon. Therefore, the printer driver 28 determines that there is not a set of image coordinates registered as the n-th data on the list (S148: No). Then, the printer driver 28 adds the print command updated in S150 into a header of the print data generated in S114, and transmits the print data including the print command to the printer 50 (S118).

In response to receiving the print data including the print command, the printer 50 perform a printing process to print an image based on the print data in accordance with the print command included in the print data. Specifically, the printer 50 performs the quality-prioritized printing for the image including ranges specified by the image coordinates (30, 60) and the image coordinates (90, 150), and performs the speed-prioritized printing for the other ranges. Therefore, the code images 102*a*, 102*b*, 102*c*, and 102*d* are printed with priority on the print quality, and the other portions than the code images 102*a*, 102*b*, 102*c*, and 102*d* are printed with priority on the printing speed. Thereby, it is possible to ensure appropriate printing of the code images 102*a*, 102*b*, 102*c*, and 102*d* and to suppress reduction of the printing speed.

Advantageous Effects of Illustrative Embodiment

The aforementioned illustrative embodiment provides the following advantageous effects.

The printer driver 28 generates a print command for instructing the printer 50 to perform the quality-prioritized printing for the image including ranges and perform the speed-prioritized printing for the other ranges, and adds the generated print command to the print data. Then, the printer driver 28 transmits the print data including the print command to the printer 50. Thereby, it is possible to ensure appropriate printing of the code images 102*a*, 102*b*, 102*c*, and 102*d*, and to suppress reduction of the printing speed.

Further, the print command is included in the header of the print data. Thereby, the printer 50 receives the print command at the beginning of a period of time for receiving the print data. Therefore, the printer 50 is enabled to start the printing process according to the print command immediately after receiving the print data.

Further, in response to a user operation to the radio button 126*a* on the setting screen 120, the printer 50 performs the speed-prioritized printing process. In response to a user operation to the radio button 126*b* on the setting screen 120, the printer 50 performs the quality-prioritized printing process. In response to a user operation to the radio button 126*c* on the setting screen 120, the printer 50 performs the quality-speed-prioritized printing process. Thereby, it is possible to cause the printer 50 to perform a printing process according to a user's intention.

Further, the printer driver 28 specifies all of the image including ranges each including at least one of the code images 102*a*, 102*b*, 102*c*, and 102*d* in the code including image 112. Then, the printer driver 28 generates a print command for instructing the printer 50 to perform the quality-prioritized printing for all of the specified image including ranges and perform the speed-prioritized printing for the other ranges than the specified image including ranges. Thereby, it is possible to cause the printer 50 to appropriately print all the code images 102a, 102b, 102c, and 102d.

Further, for instance, as shown in FIG. 8, when the first code image 102a and the second code image 102b overlap each other so as to cover a same range in the conveyance direction for the code including image 112, an image including range is defined as a range in the conveyance direction between an upstream end (i.e., an upstream end of the first code image 102a in the example shown in FIG. 8) of the first and second code images 102a and 102b and a downstream end (i.e., a downstream end of the second code image 102b in the example shown in FIG. 8) of the first and second code images 102a and 102b. Thereby, the printer 50 performs the quality-prioritized printing collectively for the first code image 102a and the second code image 102b. Thus, it is possible to ensure appropriate printing of the first code image 102a and the second code image 102b.

Further, in the speed-prioritized printing, as the number of dots to be heated in single-line printing increases, the printer 50 conveys the printing sheet at a lower speed. Thereby, even in the speed-prioritized printing, it is possible to ensure appropriate printing.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and is capable of changes or modifications within the scope of the inventive concept as expressed herein. For instance, the following modifications according to aspects of the present disclosure are feasible.

In the aforementioned illustrative embodiment, in the quality-speed-prioritized printing process, the printer 50 conveys the printing sheet at the lowest speed to prioritize the print quality for the image including ranges, regardless of a type of each code image. Nonetheless, the conveyance speed for the printing sheet may be changed depending on the type of each code image. Specifically, in a case where a barcode is used as a code image, when an extending direction of parallel bars included in the barcode corresponds to the conveyance direction for the printing sheet, the conveyance speed for the printing sheet may be set to the second lowest speed. Meanwhile, when the extending direction of the parallel bars included in the barcode does not correspond to the conveyance direction for the printing sheet, the conveyance speed for the printing sheet may be set to the lowest speed. This is because it is more difficult to linearly print parallel bars extending in a direction not corresponding to the conveyance direction, than to linearly print parallel bars extending in the direction corresponding to the conveyance direction. Thereby, even though a barcode to be printed has parallel bars extending in a direction not corresponding to the conveyance direction for the printing sheet, it is possible to ensure appropriate printing of the barcode.

Figure 10:
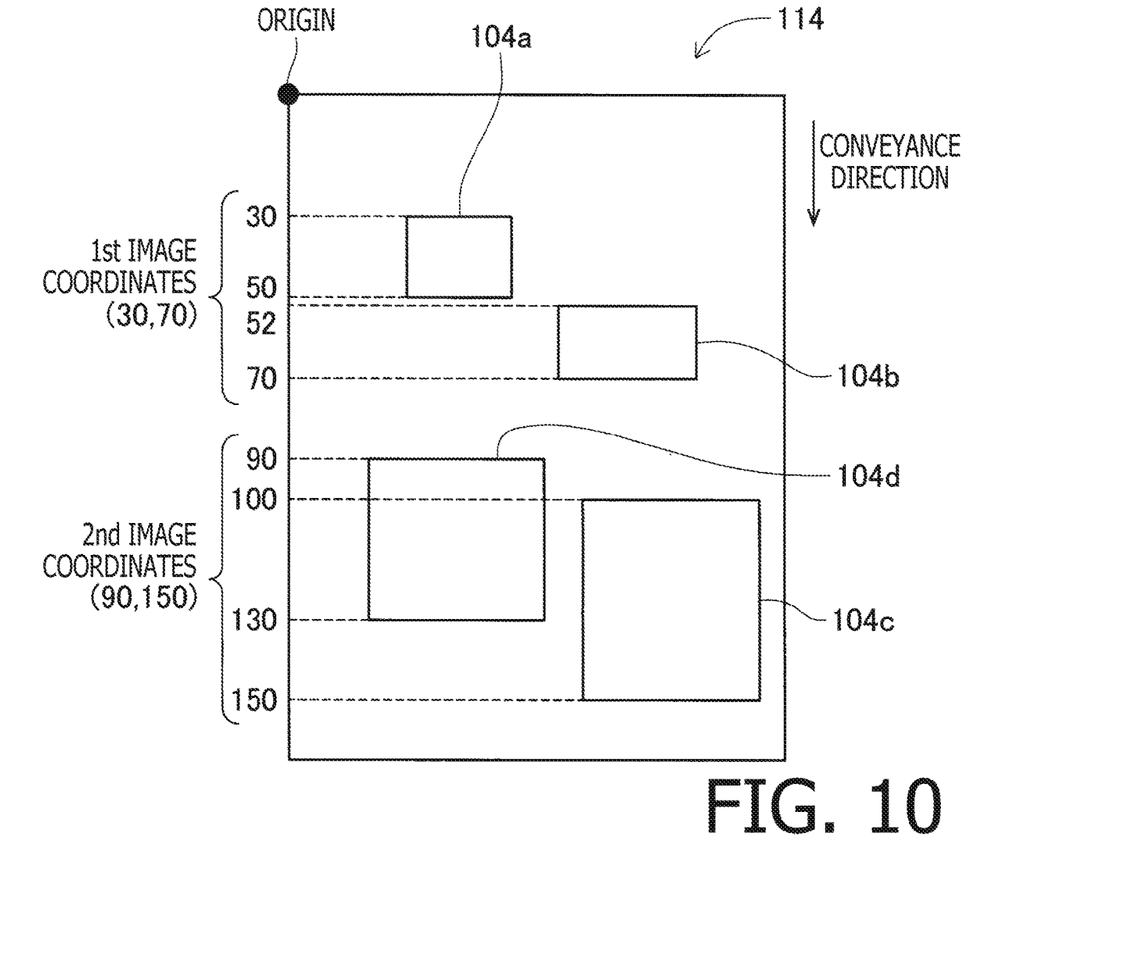
FIG. 10 exemplifies a code including image in a modification according to one or more aspects of the present disclosure.

In the aforementioned illustrative embodiment, for instance, when the first code image 102a and the second code image 102b overlap each other so as to cover a same range in the conveyance direction for the code including image 112, an image including range is defined as a range, in the conveyance direction, including at least one of the first code image 102a and the second code image 102b. Nonetheless, a range, in the conveyance direction, including none of the first code image 102a and the second code image 102b may be defined as a part of the image including range. Specifically, as shown in FIG. 10, suppose for instance that a code including image 114 includes four code images 104a, 104b, 104c, and 104d, and the code image 104a does not overlap the code image 104b in the conveyance direction for the code including image 114. In this example, a clearance between the code images 104a and 104b in the conveyance direction is so narrow that complicated control might be required to switch between the quality-prioritized printing and the speed-prioritized printing over an area containing the code images 104a and 104b and the clearance therebetween. In such a case, there is no longer any advantage in switching between the quality-prioritized printing and the speed-prioritized printing. Hence, even though two code images do not overlap each other in the conveyance direction for a code including image including the two code images, when a clearance between the two code images is equal to or shorter than a particular distance, the two code images may be included in a single image including range. Specifically, for instance, in S130, when a coordinate difference between an upstream end and a downstream end of a clearance between a plurality of code images 104 in the conveyance direction is equal to or less than 3, the printer driver 28 may make an affirmative determination (S130: Yes). Namely, in the case of the code images 104a and 104b, a coordinate difference of the clearance between a downstream end of the code image 104a and an upstream end of the code image 104b in the conveyance direction is 2. Therefore, a range in the conveyance direction between an upstream end of the code image 104a and a downstream end of the code image 104b may be defined as an image including range. In this case, a set of coordinates (30, 70) may be registered as first image coordinates on the list. Thereby, it is possible to avoid useless switching between the quality-prioritized printing and the speed-prioritized printing.

In the aforementioned illustrative embodiment, each image including range is represented by a set of image coordinates, i.e., an upstream end coordinate and a downstream end coordinate of a corresponding code image in the conveyance direction. Nonetheless, each image including range may be represented in any other method for appropriately specifying each image including range. For instance, each image including range may be represented by one of the upstream end coordinate and the downstream end coordinate of the corresponding code image in the conveyance direction and data representing a length of the code image in the conveyance direction. For instance, the printer driver 28 may calculate the downstream end coordinate of the code image in the conveyance direction, based on the upstream end coordinate and the length of the code image in the conveyance direction. Namely, each image including range may be represented by data indirectly representing the upstream end coordinate and the downstream end coordinate of the corresponding code image in the conveyance direction. Further, a set of image coordinates for specifying an image including range may not necessarily represent precise positions of the image including range in the conveyance direction. For instance, when a code including image is sectioned into a plurality of relatively-large blocks each having a certain degree of width (e.g., 1 cm) in the conveyance direction, an upstream end position and a downstream end position of each code image included in the code including image in the conveyance direction may be represented by specific blocks of the plurality of blocks. In this case, when two or more code images overlap with a same block, the printer driver 28 may make the affirmative determination in S130 (S130: Yes). Suppose for instance that the code including image 112 shown in FIG. 8 is sectioned into 8 blocks each having a width of 20 in the unit for the image coordinates and that each of the code images 102a, 102b, 102c, and 102d is represented by using the 8 blocks, which are expressed by coordinates (0, 20), (20, 40), . . . , (120, 140), and (140, 160), respectively. In this case, since the code images 102a and 102b overlap with the same block (40, 60), the printer driver 28 may make the affirmative determination in S130 (S130: Yes).

Further, in another instance, in the flowchart shown in FIG. 7, the printer driver 28 may generate a print command for instructing the printer 50 to perform the speed-prioritized printing for every image coordinate, immediately before S146. In a further instance, in the flowchart shown in FIG. 7, immediately after making the negative determination in S148 (S148: No), the printer driver 28 may update the print command to cause the printer 50 to perform the speed-prioritized printing for image coordinates for which the quality-prioritized printing is not set. In a further instance, in the flowchart shown in FIG. 7, the printer driver 28 may generate a print command for instructing the printer 50 to perform the quality-prioritized printing for every image coordinate, immediately before S146. In this case, immediately after making the negative determination in S148 (S148: No), the printer driver 28 may update the print command to cause the printer 50 to perform the speed-prioritized printing for image coordinates for which the quality-prioritized printing is not set.

Further, in the quality-speed-prioritized printing process, the quality-prioritized printing may be performed for images (e.g., images complicated or required to be drawn with clarity) other than the code images 102a, 102b, 102c, and 102d.

In the aforementioned illustrative embodiment, the processes as shown in FIGS. 4 to 7 are performed by the CPU 12. Nonetheless, the processes as shown in FIGS. 4 to 7 may be performed by one or more ASICs or by one or more other logic integrated circuits. In another instance, the processes as shown in FIGS. 4 to 7 may be performed by one or more CPUs, one or more ASICs, and one or more other logic integrated circuits in cooperation with each other.

Associations between elements exemplified in the aforementioned illustrative embodiments and elements according to aspects of the present disclosure will be exemplified below. The communication system 1 may be an example of a "system" according to aspects of the present disclosure. The PC 10 may be an example of an "information processing device" according to aspects of the present disclosure. The printer 50 may be an example of a "printer" according to aspects of the present disclosure. The CPU 12 of the PC 10 may be an example of a "processor" of the "information processing device" according to aspects of the present disclosure. The memory 14 of the PC 10 may be an example of a "non-transitory computer-readable medium" according to aspects of the present disclosure. The printer driver 28 stored in the memory 14 may be an example of "computer-readable instructions" according to aspects of the present disclosure. The network I/F 20 of the PC 10 may be an example of a "communication interface" of the "information processing device" according to aspects of the present disclosure. The input I/F 18 of the PC 10 may be an example of a "user interface" of the "information processing device" according to aspects of the present disclosure. The CPU 12 and the memory 14 may be included in a "controller" of the "information processing device" according to aspects of the present disclosure. In this case, the CPU 12 may be an example of a "processor" included in the "controller" according to aspects of the present disclosure. Further, the memory 14 may be an example of a "memory" included in the "controller" according to aspects of the present disclosure.

What is claimed is:

1. A non-transitory computer-readable medium storing computer-readable instructions that are executable by a processor of an information processing device communicably connected with a printer, the instructions being configured to, when executed by the processor, cause the processor to:
receive image data representing a target image to be printed;
detect feature image data from the received image data, the feature image data representing a feature image having particular features;
determine range data based on the detected feature image data, the range data representing a first end position and a second end position of a first range in a particular direction, the first range including the feature image and being included in the target image, the particular direction corresponding to a conveyance direction in which the printer conveys a printing sheet to print the target image;
generate print instruction data based on the determined range data, the print instruction data including a particular command for instructing the printer to:
perform a first printing process to print the first range by conveying the printing sheet at a first conveyance speed; and
perform a second printing process to print a second range of the target image other than the first range, by conveying the printing sheet at a second conveyance speed higher than the first conveyance speed; and
output the generated print instruction data including the particular command, to cause the printer to perform the first printing process and the second printing process.

2. The non-transitory computer-readable medium according to claim 1,
wherein the instructions are further configured to, when executed by the processor, cause the processor to output the print instruction data with the particular command included in a header of the print instruction data.

3. The non-transitory computer-readable medium according to claim 1, wherein the information processing device further comprises a user interface configured to accept a selection from among a particular mode, a first mode, and a second mode, and wherein the instructions are further configured to, when executed by the processor, cause the processor to:
in response to accepting a selection of the particular mode via the user interface, generate the print instruction data including the particular command;
in response to accepting a selection of the first mode via the user interface, generate the print instruction data including a first command for instructing the printer to perform the first printing process to print a whole area of the target image by conveying the printing sheet at the first conveyance speed; and
in response to accepting a selection of the second mode via the user interface, generate the print instruction data including a second command for instructing the printer to perform the second printing process to print the whole area of the target image by conveying the printing sheet at the second conveyance speed.

4. The non-transitory computer-readable medium according to claim 1,
wherein the instructions are further configured to, when executed by the processor, cause the processor to:
when the target image represented by the received image data includes a plurality of feature images, detect, from the image data, a plurality of pieces of feature image data each representing a corresponding one of the plurality of feature images;
detect all first ranges each including at least one of the plurality of feature images;
determine each piece of range data representing a first end position and a second end position of a corresponding one of all the detected ranges in the particular direction; and
generate the print instruction data based on every piece of the determined range data, the print instruction data including the particular command for instructing the printer to:
perform the first printing process to print all first ranges by conveying the printing sheet at the first conveyance speed; and
perform the second printing process to print the second range other than the first ranges by conveying the printing sheet at the second conveyance speed.

5. The non-transitory computer-readable medium according to claim 4,
wherein the instructions are further configured to, when executed by the processor, cause the processor to:
when a specific one of the detected feature-image including ranges includes two or more feature images, determine, as the first end position of the specific feature-image including range, a most upstream one of respective upstream ends of the two or more feature images in the particular direction, and determine, as the second end position of the specific feature-image including range, a most downstream one of respective downstream ends of the two or more feature images in the particular direction.

6. The non-transitory computer-readable medium according to claim 4,
wherein the instructions are further configured to, when executed by the processor, cause the processor to:
when two feature images included in the target image are separate from each other in the particular direction, and a clearance between the two feature images in the particular direction is equal to or shorter than a particular distance, determine the two feature images as included in a single feature-image including range, determine, as the first end position of the single feature-image including range, an upstream end of an upstream one of the two feature images in the particular direction, and determine, as the second end position of the single feature-image including range, a downstream end of a downstream one of the two feature images in the particular direction.

7. The non-transitory computer-readable medium according to claim 1,
wherein the instructions are further configured to, when executed by the processor, cause the processor to:
detect, from the received image data, the feature image data representing a barcode as the feature image;
when the barcode represented by the detected feature image data has bars extending in a direction not corresponding to the particular direction, generate the print instruction data including the particular command for instructing the printer to:
perform the first printing process to print the feature-image including range including the barcode, by conveying the printing sheet at a lower conveyance speed than when the barcode has bars extending in a direction corresponding to the particular direction; and
perform the second printing process to print the other range than the feature-image including range including the barcode, by conveying the printing sheet at the second conveyance speed.

8. The non-transitory computer-readable medium according to claim 1,
wherein the printer is configured to:
receive the print instruction data from the information processing device;
based on the received image data, perform a printing process to print the target image on the printing sheet by repeatedly performing single-line printing while conveying the printing sheet in the conveyance direction, the single-line printing being performed by selectively heating a plurality of heatable elements arranged along a direction intersecting with the conveyance direction; and
during the printing process, based on the particular command included in the print instruction data, perform the second printing process for the second range other than the first ranges, by conveying the printing sheet at a higher conveyance speed than when performing the first printing process for the feature-image including range, the conveyance speed being made lower as a count of elements heated in the single-line printing among the plurality of heatable elements increases.

9. An information processing device comprising:
a communication interface configured to communicate with a printer; and
a controller configured to:
receive image data representing a target image to be printed;
detect feature image data from the received image data, the feature image data representing a feature image having particular features;
determine range data based on the detected feature image data, the range data representing a first end position and a second end position of a first range in a particular direction, the first range including the feature image and being included in the target image, the particular direction corresponding to a conveyance direction in which the printer conveys a printing sheet to print the target image;

generate print instruction data based on the determined range data, the print instruction data including a particular command for instructing the printer to:

perform a first printing process to print the first range by conveying the printing sheet at a first conveyance speed; and perform a second printing process to print a second range of the target image other than the first range, by conveying the printing sheet at a second conveyance speed higher than the first conveyance speed; and output the generated print instruction data including the particular command, to cause the printer to perform the first printing process and the second printing process.

10. The information processing device according to claim 9,
wherein the controller comprises:
a processor; and
a memory storing computer-readable instructions configured to, when executed by the processor, cause the processor to:
receive the image data;
detect the feature image data from the received image data;
determine the range data based on the detected feature image data;
generate the print instruction data including the particular command, based on the determined range data; and
output the generated print instruction data including the particular command.

11. A system comprising:
a printer; and
an information processing device comprising:
a communication interface configured to communicate with the printer; and
a controller configured to:
receive image data representing a target image to be printed;
detect feature image data from the received image data, the feature image data representing a feature image having particular features;
determine range data based on the detected feature image data, the range data representing a first end position and a second end position of a first range in a particular direction, the first range including the feature image and being included in the target image, the particular direction corresponding to a conveyance direction in which the printer conveys a printing sheet to print the target image;
generate print instruction data based on the determined range data, the print instruction data including a particular command for instructing the printer to:
perform a first printing process to print the first range by conveying the printing sheet at a first conveyance speed; and
perform a second printing process to print a second range of the target image other than the first range, by conveying the printing sheet at a second conveyance speed higher than the first conveyance speed; and
output the generated print instruction data including the particular command, to cause the printer to perform the first printing process and the second printing process.

* * * * *

UNITED STATES PATENT AND TRADEMARK OFFICE
CERTIFICATE OF CORRECTION

PATENT NO. : 10,754,594 B2
APPLICATION NO. : 16/401428
DATED : August 25, 2020
INVENTOR(S) : Mareyuki Murata It is certified that error appears in the above-identified patent and that said Letters Patent is hereby corrected as shown below:

In the Claims

Column 17, Claim 4, Line 35 should read:
sponding one of all the detected first ranges in the par- Column 17, Claim 4, Line 41 should read:
perform the first printing process to print all the first Column 17, Claim 5, Lines 52-53 should read:
when a specific one of the detected first ranges includes two or more feature Column 17, Claim 5, Line 55 should read:
specific first range, a most Column 17, Claim 5, Line 59 should read:
specific first range, a most down- Column 18, Claim 6, Lines 4-6 should read:
images as included in a single first range, determine as the first end position of the single first range, an upstream Column 18, Claim 6, Line 9 should read:
end position of the single first Column 18, Claim 7, Lines 23-24 should read:
perform the first printing process to print the first range including the barcode, by Column 18, Claim 7, Lines 29 and 30 should read:
perform the second printing process to print the second range other than the first range Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,754,594 B2

Column 18, Claim 8, Line 49 should read:
range other than the first range, by conveying the Column 18, Claim 8, Line 52 should read:
first range, the conveyance